(12) United States Patent
De Haseth et al.

(10) Patent No.: US 12,036,962 B2
(45) Date of Patent: Jul. 16, 2024

(54) MONITORING MACHINE BRAKE PERFORMANCE

(71) Applicant: Caterpillar SARL, Geneva (CH)

(72) Inventors: Andrew De Haseth, Tucson, AZ (US); Raymond Lathan, Durham (GB); Shinya Sono, Naperville, IL (US); Ian Macdonald, Hoffman Estates, IL (US); Rodney Menold, Hanna City, IL (US); Timothy Schwartz, East Peoria, IL (US); David Wisley, Darlington (GB)

(73) Assignee: Caterpillar SARL, Geneva (CH)

( * ) Notice: Subject to any disclaimer, the term of this patent is extended or adjusted under 35 U.S.C. 154(b) by 480 days.

(21) Appl. No.: 17/294,766

(22) PCT Filed: Nov. 21, 2019

(86) PCT No.: PCT/EP2019/025414
§ 371 (c)(1),
(2) Date: May 18, 2021

(87) PCT Pub. No.: WO2020/104069
PCT Pub. Date: May 28, 2020

(65) Prior Publication Data
US 2021/0402972 A1    Dec. 30, 2021

(30) Foreign Application Priority Data
Nov. 23, 2018 (GB) ...................................... 1819077

(51) Int. Cl.
*B60T 17/00* (2006.01)
*B60T 17/22* (2006.01)

(52) U.S. Cl.
CPC ......... *B60T 17/221* (2013.01); *B60T 2210/20* (2013.01); *B60T 2210/36* (2013.01);
(Continued)

(58) Field of Classification Search
CPC ............... B60T 17/221; B60T 2250/02; B60T 2270/88; B60T 13/662; B60T 2220/04;
(Continued)

(56) References Cited

U.S. PATENT DOCUMENTS

| 3,722,269 A | 3/1973 | Gunnell et al. |
| 5,101,660 A | 4/1992 | La Belle |

(Continued)

FOREIGN PATENT DOCUMENTS

| CA | 2297741 A1 | 2/1999 |
| CN | 101903224 | 12/2010 |

(Continued)

OTHER PUBLICATIONS

International Search Report related to Application No. PCT/EP2019/025414; reported on Mar. 3, 2020.
(Continued)

*Primary Examiner* — Truc M Do

(57) ABSTRACT

Monitoring the brake performance of a brake system of a machine and a control systems for performing such monitoring. The machine's brake system is monitored by detecting a brake engagement for decelerating the machine. When a brake engagement is detected, a parasitic loss decelerating the machine during the brake engagement is determined. The parasitic loss is used to predict deceleration of the machine during the brake engagement Brake performance of the brake system of the machine is processed from the predicted deceleration.

29 Claims, 5 Drawing Sheets

(52) U.S. Cl.
CPC ..... *B60T 2250/02* (2013.01); *B60T 2270/406* (2013.01); *B60T 2270/88* (2013.01)

(58) Field of Classification Search
CPC ............... B60T 2270/406; B60T 8/885; B60T 2210/20; B60T 2210/36; B60T 2240/00; B60T 2250/00; B60T 7/12; B60T 8/00; B60T 8/171; B60T 8/58; G01L 5/286; G01L 5/28; G01L 5/282
See application file for complete search history.

(56) References Cited

U.S. PATENT DOCUMENTS

| | | | |
|---|---|---|---|
| 5,154,076 | A | 10/1992 | Wilson et al. |
| 5,385,042 | A | 1/1995 | La Belle |
| 5,465,612 | A | 11/1995 | La Belle |
| 6,332,354 | B1 * | 12/2001 | Lalor ........................ G01L 5/28 73/121 |
| 9,840,316 | B1 | 12/2017 | Jaszewski |
| 9,964,210 | B1 | 5/2018 | Jaszewski et al. |
| 2006/0207842 | A1 * | 9/2006 | Strandberg ............ B60T 17/221 188/264 D |
| 2007/0208841 | A1 * | 9/2007 | Barone ............... B61L 15/0027 709/223 |
| 2009/0101428 | A1 * | 4/2009 | Itoh ........................ B60T 8/175 180/197 |
| 2016/0016574 | A1 | 1/2016 | Yang et al. |
| 2018/0052463 | A1 * | 2/2018 | Mays ................... G07C 5/0808 |

FOREIGN PATENT DOCUMENTS

| | | |
|---|---|---|
| CN | 105691380 | 6/2016 |
| DE | 19755112 A1 | 6/1998 |
| EP | 1832480 A1 | 9/2007 |
| JP | 2003160046 A | 6/2003 |

OTHER PUBLICATIONS

Great Britain Search Report related to Application No. 1819077.7; reported on Apr. 11, 2019.
Chinese Office Action for Chinese Patent Appln. No.201980077163.0, mailed Jun. 14, 2023 (6 pgs).

* cited by examiner

MONITORING MACHINE BRAKE PERFORMANCE

CROSS-REFERENCE TO RELATED APPLICATION

This Application is a 35 USC § 371 US National Stage filing of International Application No. PCT/EP2019/025414 filed on Nov. 21, 2019 which claims priority under the Paris Convention to Great Britain Patent Application No. 1819077.7 filed on Nov. 23, 2018.

BACKGROUND

The present disclosure relates to a method of monitoring the brake performance of a machine and a system for performing such a method.

Brake systems of machines are typically configured to provide a predetermined brake performance. The predetermined brake performance may, for example, be a measure of the distance and/or time required by the brake system to bring a machine from a predetermined speed to a halt. Machines are typically required to meet certain standards of braking performance based upon certain conditions, such as when braking on a certain inclination, when the machine has a certain load and the like. Such machines may include hauling machines, such as dump trucks, off-highway trucks, on-highway lorries/trucks, mining trucks, articulated haulers, earth-moving machines, such as backhoes, loaders, dozers, shovels, motor graders, wheel tractor scrapers, excavators and other such vehicles.

It may be desirable to continuously monitor the brake performance of a brake system during its operation and over time. A common approach is to perform visual, static checks on the brake system to determine whether it meets certain criteria, such as a predetermined brake pad wear or the like. Alternatively, US-B1-6332354 discloses determining the effectiveness of a vehicle braking system. Vehicle mass is manually or automatically measured, brake system pressure is measured during deceleration of the vehicle, road slope is measured and air friction and engine friction of the vehicle is measured. A predicted deceleration of the vehicle is calculated based upon data representing these parameters under comparable circumstances. Brake effectiveness is calculated using the predicted deceleration and a measured actual deceleration. However, further improvements may be required to improve the accuracy and reliability of brake performance determinations.

SUMMARY

The present disclosure provides for monitoring brake performance of a brake system of a machine by detecting a brake engagement for decelerating the machine, determining a parasitic loss decelerating the machine during the brake engagement, and using a predicted deceleration of the machine during the brake engagement based upon the parasitic loss to determine the brake performance.

The present disclosure further provides a system for monitoring brake performance of a machine comprising a brake system. The system includes a control system for monitoring the brake performance of the brake system that detects a brake engagement for decelerating the machine, measures a parasitic loss decelerating the machine during the brake engagement, processes a predicted deceleration of the machine during the brake engagement based upon the measured parasitic loss, and determines brake performance based upon the predicted deceleration.

The present disclosure provides a computer readable medium storing computer executed instructions for performing the method set out in the present disclosure. The method of the present disclosure may comprise operating the control system to perform the method.

Further aspects of the present disclosure are set out in the following numbered clauses:

1. A method of monitoring brake performance of a brake system of a machine, the method comprising:
    detecting a brake engagement for decelerating the machine;
    determining a parasitic loss decelerating the machine during the brake engagement;
    determining a predicted deceleration of the machine during the brake engagement based upon the parasitic loss; and
    determining brake performance based upon the predicted deceleration.

2. A method as in clause 1 further comprising detecting an actual deceleration of the machine during the brake engagement and determining the brake performance based upon the actual and predicted decelerations.

3. A method as in any one of the preceding clauses wherein the predicted deceleration is further determined based upon at least one operating condition of the brake system measured during the brake engagement and a brake map.

4. A method as in clause 3 wherein the at least one operating condition of the brake system comprises at least one of a brake system pressure, an inclination of the machine, a mass of the machine and a drag force of the machine.

5. A method as in any one of the preceding clauses wherein the parasitic loss comprises an estimated rolling resistance of the machine.

6. A method as in clause 5 wherein the rolling resistance is estimated based upon at least one operating condition of the machine measured before the brake engagement and/or during the brake engagement.

7. A method as in clause 5 or clause 6 wherein the rolling resistance is estimated based upon an estimated driving force of the machine and an actual acceleration of the machine.

8. A method as in clause 7 wherein the estimated driving force is determined based upon lookup tables and at least one operating condition and/or based upon an estimated driving torque driving at least one wheel of the machine and a known radius of the at least one wheel.

9. A method as in any one of clauses 6 to 8 wherein the at least one operating condition comprises a location of the machine and the rolling resistance is estimated based upon the location of the machine and a map indicating the estimated rolling resistance of a terrain across which the machine is travelling.

10. A method as in any one of the preceding clauses wherein the parasitic loss comprises an estimated windage loss in the machine during the brake engagement.

11. A method as in clause 10 wherein the estimated windage loss is in at least one rotating component of the machine.

12. A method as in clause 11 wherein at least one of the engine system and brake system comprise the at least one rotating component.

13. A method as in clause 11 or clause 12 wherein estimating the windage loss comprises:

determining at least one oil temperature of oil in contact with the at least one rotating component;

determining at least one rotational speed of the at least one rotating component;

retrieving windage loss data; and determining the windage loss based upon the at least one oil temperature, at least one rotational speed and windage loss data.

14. A method as in any one of the preceding clauses wherein the predicted deceleration is determined based upon an estimation of the deceleration resulting from the estimated windage loss and/or estimated rolling resistance.

15. A method as in any one of the preceding clauses further comprising generating an alert based upon the determined brake performance.

16. A method as in clause 15 comprising determining that the brake performance has reached a minimum brake performance threshold and, in response, generating the alert.

17. A method as in any one of the preceding clauses comprising:

determining whether at least one rejection condition occurs during the brake engagement, comprising determining whether the parasitic loss exceeds a threshold value; and in response to the detection of at least one rejection condition, rejecting brake performance data associated with the brake engagement or preventing the generation of brake performance data associated with the brake engagement.

18. A method as in clause 17 wherein determining whether the parasitic loss exceeds a threshold value comprises:

estimating a rolling resistance of the machine and determining that the estimated rolling resistance exceeds a rolling resistance threshold value; and/or estimating windage losses in the machine during the brake engagement and determining that the windage losses exceed a windage loss threshold value; and 19. A method as in clause 17 or clause 18 wherein rejecting generated brake performance data comprises:

preventing the storing of the generated brake performance data on a memory;

storing on the memory brake performance data comprising a brake performance and a rejection marker associated with the brake performance; and/or disregarding the generated brake performance during further analysis of brake performance related to a plurality of brake engagements.

20. A system comprising:

a machine comprising a brake system; and a control system for monitoring the brake performance of the brake system and configured to:

detect a brake engagement for decelerating the machine;

determine a parasitic loss decelerating the machine during the brake engagement;

determine a predicted deceleration of the machine during the brake engagement based upon the parasitic loss; and determine brake performance based upon the predicted deceleration.

BRIEF DESCRIPTION OF THE DRAWINGS

By way of example only, embodiments of a method and system of the present disclosure are now described with reference to, and as shown in, the accompanying drawings, in which.

DETAILED DESCRIPTION

Figure 1:
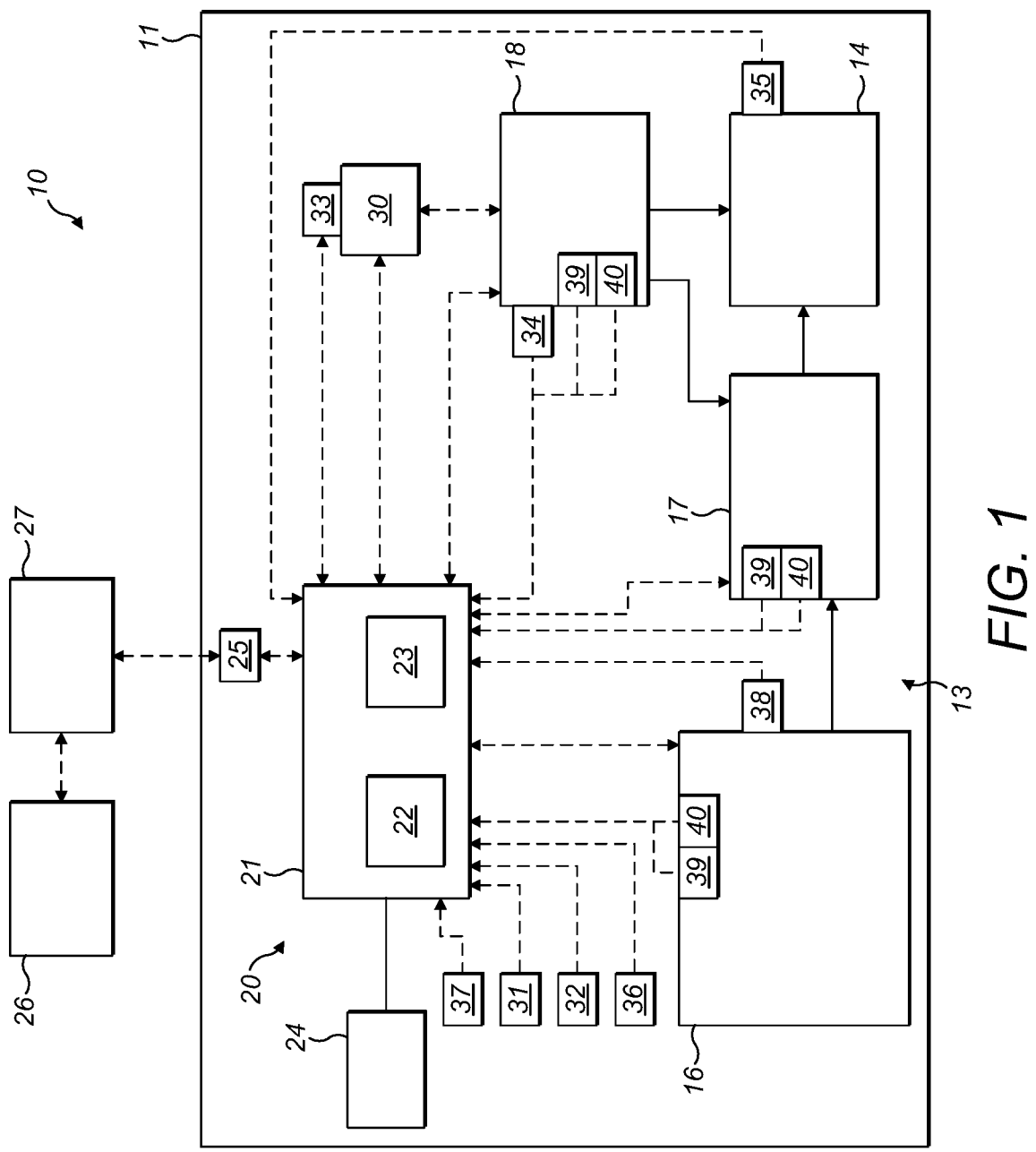
FIG. 1 is a schematic representation of an embodiment of a system according to the present disclosure.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements, including combinations of features from different embodiments, without departing from the scope of the invention. Specific details are given in the following description to provide a thorough understanding of the embodiments. However, it will be understood by one of ordinary skill in the art that embodiments may be practised without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to monitoring the performance of a brake system of a machine and systems comprising control systems configured to perform such methods. The brake performance may be determined based upon a predicted deceleration and a measured deceleration during a brake engagement. The predicted deceleration may take account of the rolling resistance and windage losses of the machine. The brake performance data may be filtered to exclude data resulting from brake engagements in which a skid occurs. The performance may be monitored by identifying substantial changes or increases in rates of change of the brake performance over a longer time period. The performance may also be assessed and/or analysed further by determining a brake delay between the operator instructing a brake engagement and the brake system actually engaging.

Figure 2:
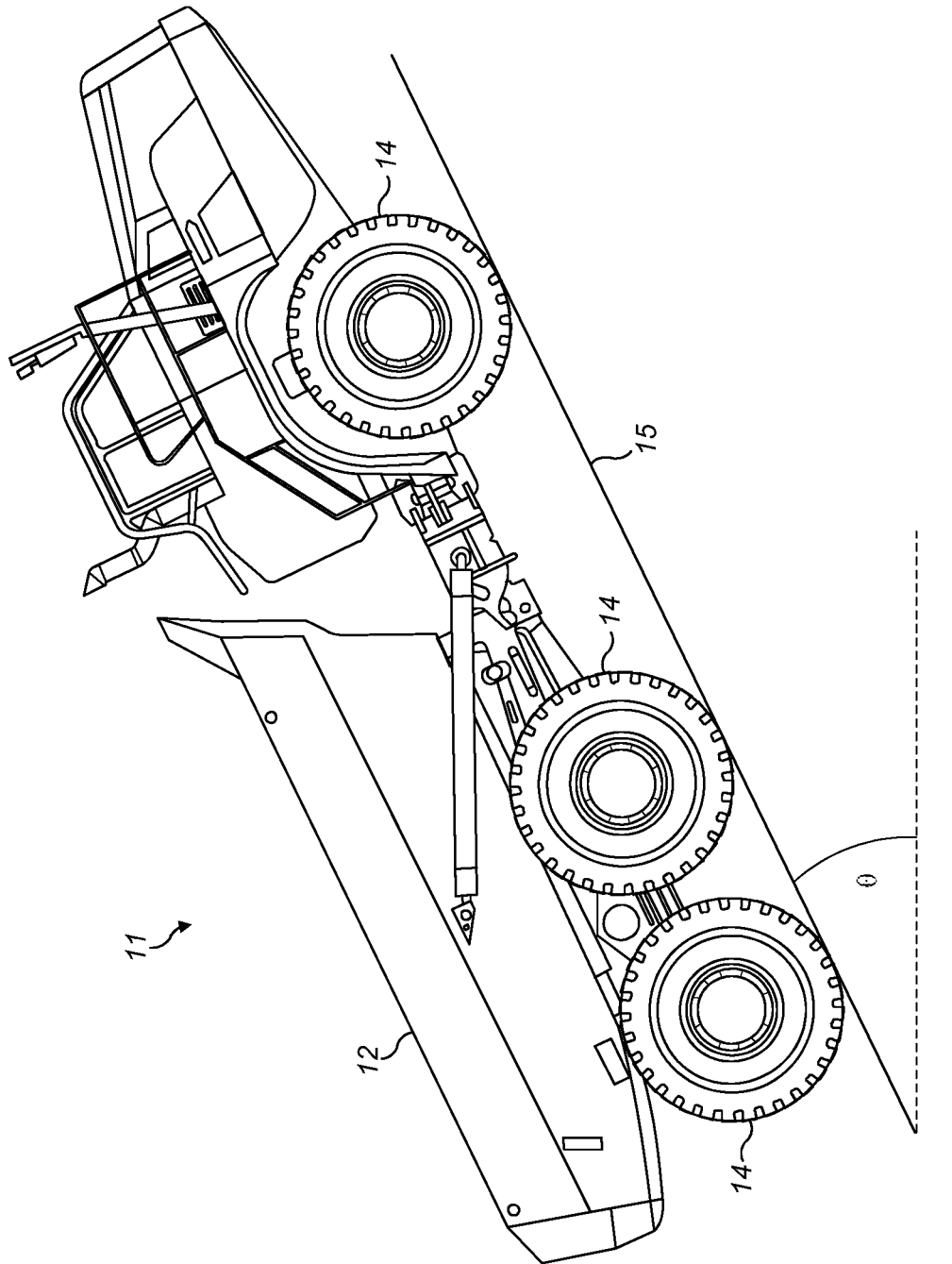
FIG. 2 is a schematic representation of an embodiment a machine of the system of FIG. 1.

FIG. 1 illustrates an embodiment of a system 10 of the present disclosure comprising a machine 11, which is illustrated in further detail in FIG. 2. The machine 11 may be any type of machine or vehicle, such as the illustrated articulated hauler. In other embodiments, the machine 11 may comprise any other type of hauling machine or vehicle (i.e. configured predominantly for transporting bulk material), work and/or material handling machine or vehicle (i.e. configured to perform work), such as a dump truck, off-highway truck, on-highway lorry/truck, mining truck, articulated hauler, backhoe, loader, dozer, shovel, wheel tractor scraper, drilling machine, motor grader, forestry machine, excavator and the like. The machine 11 may comprise at least one work tool 12 for performing work, such as a dump body as illustrated, a bucket, shears, a fork, hammer, plow, handling arm, multi-processor, pulveriser, saw, shears, blower, grinder, tiller, compactor, trencher, winch, auger, blade, broom, cutter, planer, delimber, felling head, grapple, mulcher, ripper, rake or the like.

The machine 11 may comprise an engine system 13 configured to drive at least one wheel 14 to move the machine 11 across a terrain 15. The at least one wheel 14 may drive tracks attached thereto or the like. The engine system 13 may comprise at least one power unit 16 (e.g. an internal combustion engine, electric motor and/or hydraulic motor) configured to drive a powertrain 17. The powertrain 17 may comprise at least one transmission, torque converter, transfer gear, output shaft, axle or the like for transferring power from the engine system 13 to drive the at least one wheel 14.

The machine 11 may comprise a brake system 18 for decelerating the machine 11 as it moves across the terrain 15. The brake system 18 may be of any suitable type, such as an air brake system or a hydraulic brake system, and may be configured to selectively apply a braking force to the at least one wheel 14 and/or powertrain 17. The brake system 18 may comprise at least one pad, at least one rotor, at least one drum, at least one piston and/or the like. In the case of an air brake system, it may comprise an air distribution system, including a brake chamber, containing pressurised air for controlling the application of the brake system 18. In addition to the brake system 18, the machine 11 may comprise alternative means for reducing its speed, such as an engine braking system or a hydraulic retarder.

The system 10 may comprise a control system 20, which may be configured to perform the methods of the present disclosure. The control system 20 may comprise a controller 21, which may comprise a memory 22, which may store instructions or algorithms in the form of data, and a processing unit 23, which may be configured to perform operations based upon the instructions. The controller 21 may be of any suitable known type and may comprise an engine control unit (ECU) or the like. The memory 22 may comprise any suitable computer-accessible or non-transitory storage medium for storing computer program instructions, such as RAM, SDRAM, DDR SDRAM, RDRAM, SRAM, ROM, magnetic media, optical media and the like. The processing unit 23 may comprise any suitable processor capable of executing memory-stored instructions, such as a microprocessor, uniprocessor, a multiprocessor and the like. The controller 21 may further comprise a graphics processing unit for rendering objects for viewing on a display 24 of the control system 20. The controller 21 may also be in communication with least one machine communication module 25 for transferring data with an external computing system 26 via a wired or wireless network 27 (such as Ethernet, fibre optic, satellite communication network, broadband communication network, cellular, Bluetooth). The external computing system 26 may comprise computing systems, processors, servers, memories, databases, control systems and the like.

The controller 21 may be communicatively connected (via a wired or wireless connection) to the power unit 16, powertrain 17 and/or brake system 18 for providing control signals thereto and receiving sensor signals therefrom in-order-to control the operation of the machine 11. The controller 21 may communicate with at least one input device, such as the display 24, a joystick, a button and a brake input 30, for receiving an input and controlling the machine 11. As illustrated, a brake input 30, which may comprise a brake pedal, may be in communication with the controller 21 and/or brake system 18 for controlling the actuation and engagement of the brake system 18 to decelerate the machine 11.

The controller 21 may receive operating condition data indicative of at least one operating condition of the machine 11 by being communicatively coupled with at least one sensor and/or with the power unit 16, powertrain 17 and/or brake system 18. The controller 21 may process the received operating condition data to determine further operating condition data and may store the operating condition data on the memory 22. The at least one operating condition and operating condition data may comprise at least one of:

- An inclination θ of the machine 11 relative to the direction of the gravitational force (as shown in FIG. 2). The control system 20 may comprise an inclination sensor 31 for determining the inclination θ of the machine 11 on the terrain 15 in two or three dimensions;
- A position of the machine 11. The control system 20 may comprise a navigation system 32, for example comprising a position sensor for determining position via a global navigation satellite system, for determining the position of the machine 11;
- A brake input 30 actuation, which may include the force applied to the brake input 30. The machine 11 may comprise a brake input sensor 33, which may comprise a pedal position sensor, for determining whether the brake input 30 has been actuated by an operator;
- A pressure within the brake system 18, which may be indicative of the engagement of the brake system 18. The control system 20 may comprise brake system pressure sensor 34 for determining the brake system pressure;
- A wheel speed of at least one wheel 14. The control system 20 may comprise at least one wheel speed sensor 35 for determining the wheel speed;
- A mass of the machine 11, which may be the load or weight of the machine 11 and any payload being transported by the machine 11. The mass may be input by an operator via at least one input device, stored on the memory 22 and/or estimated based upon a payload estimator 36. The payload estimator 36 may comprise at least one load sensor for detecting the mass of a payload carried by the machine 11;
- An acceleration or deceleration of the machine 11. The control system 20 may comprise an inertial measurement unit 37 (IMU) and/or may utilise the wheel speed sensor 35 for determining the acceleration;
- A machine speed of the machine 11, which may be determined via the IMU 37, the at least one wheel speed sensor 35, a powertrain speed sensor (such as an engine speed sensor 38) and/or the navigation system 32;
- An engine speed, which may be the rotational velocity of at least one output shaft of the at least one power unit 16 of the machine 11. The control system 20 may comprise the engine speed sensor 38 for determining the engine speed;
- A transmission ratio of the transmission of the powertrain 17. The transmission ratio may be determined based upon a demanded transmission ratio sent from the controller 21 to the powertrain 17 and/or a transmission ratio sensor within the powertrain 17; and/or
- Oil temperatures of oil in contact with at least one rotating component of the engine system 13, powertrain 17, or brake system 18 and rotational speeds of at least one rotating component. The oil may be lubricating and/or cooling oil. The control system 20 may comprise at least one oil temperature sensor 39 and at least one engine system component speed sensor 40 for determining the oil temperatures and rotational speeds.

The IMU 37 may comprise the inclination sensor 31. The inclination θ may be determined based upon the outputs of the IMU 37 and at least one wheel speed sensor 35. In particular, the acceleration or deceleration of the at least one wheel 14 may be determined via the at least one wheel speed sensor 35 and the inclination θ determined by accounting for such acceleration or deceleration of the at least one wheel 14 in the output of the IMU 37.

The operating condition data collected by the control system 20 may be transferred to the external computing system 26, which may perform the method of the present disclosure. Thus, the control system 20 may be considered in the present disclosure to comprise the external computing system 26, which may have instructions stored thereon for performing the methods disclosed herein in a similar manner to the controller 21.

Figure 3:
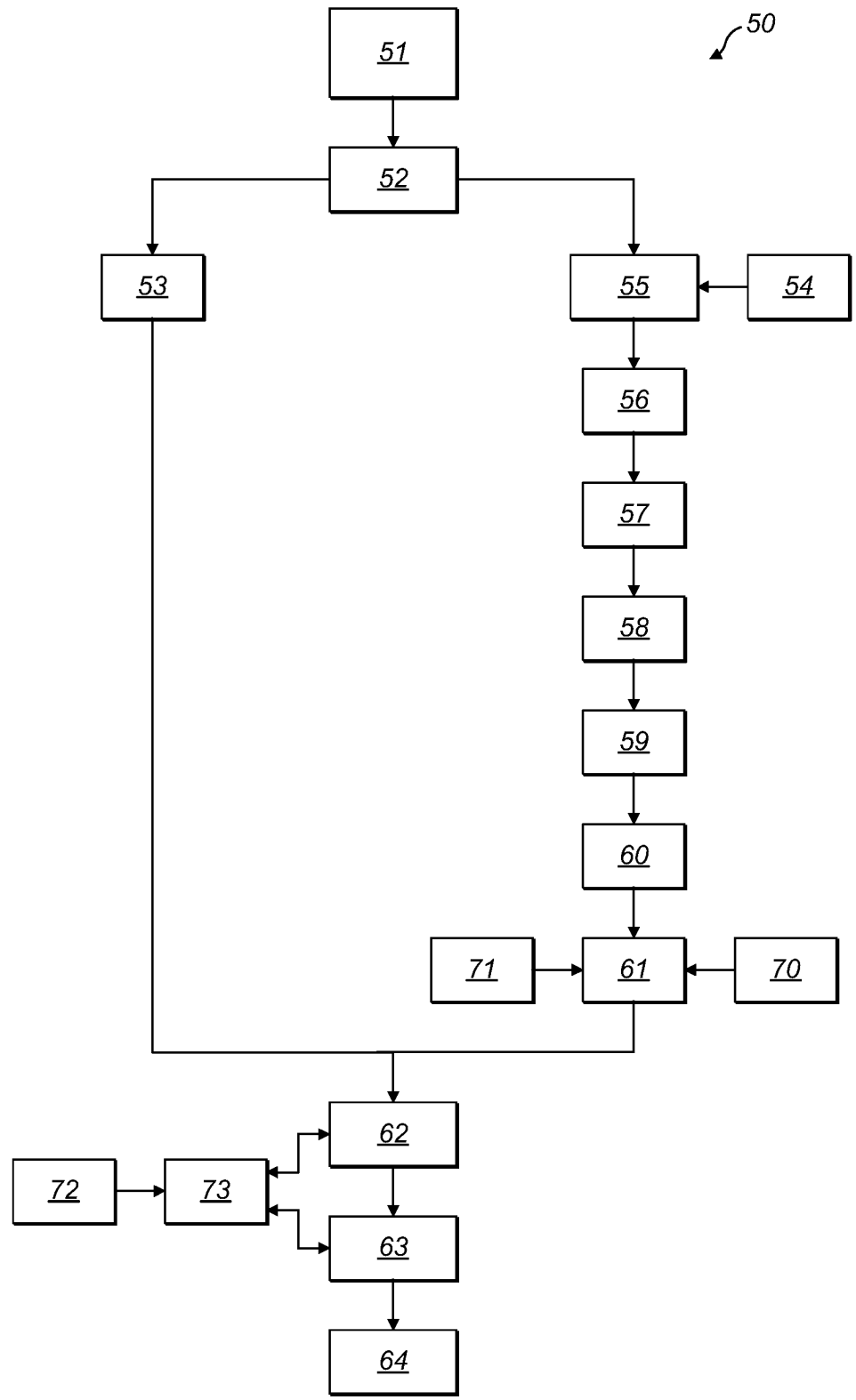
FIG. 3 is a flowchart of an embodiment of a method according to the present disclosure.

FIG. 3 illustrates a method 50 of monitoring the brake performance of the brake system 18 of the system 10 of the present disclosure. The brake performance may be indicative of the effectiveness of the brake system 18 at slowing the machine 11 upon engagement of the brake system 18, such as the distance or time required to bring the machine 11 to a halt from a predetermined speed. The brake performance may vary throughout the lifecycle of the brake system 18, such as due to standard wear of components such as brake pads. The brake performance may be assessed substantially continuously during the normal operation of the machine 11 by the control system 20. The brake performance may be determined by the control system 20 by determining an actual deceleration (AD) and a predicted deceleration (PD) of the machine 11 during a brake engagement. In particular, the brake performance (BP) may be determined as a value:

$$BP = AD/PD$$

The operator may apply the brake system 18 via the brake input 30 at step 51. The control system 20 may initially detect a resulting brake engagement at step 52. The brake engagement or brake event may be a single instance of application of the brake system 18 to slow the machine 11. The brake engagement may be detected based upon the operating condition data from at least one of the brake input sensor 33, at least one brake system pressure sensor 34 and/or at least one wheel speed sensor 35 indicating that the brake system 18 has been engaged. The brake engagement may be detected based upon the operating condition data from a plurality of wheel speed sensors 35 in-order-to improve accuracy and account for instances where, for example, different axles to which each wheel is attached being operating at lower speeds due to operation of a differential in the powertrain 17.

The brake engagement may also be detected based upon the operating condition data from a brake system pressure sensor 34 located in the brake system 18 at or close to the brake input 30 for detecting the application at the brake input 30 by the operator and/or from a brake system pressure sensor 34 located in the brake system 18 at or close to the at least one wheel 14, such as in fluid actuating a brake calliper or piston, for detecting the application by the brake system 18 to slow the at least one wheel 14. The control system 20 may also determine that the engine brake and/or hydraulic retarder are engaged, which would invalidate the brake performance data, the control system 20 may reject or not generate the brake performance data.

The control system 20 may determine the actual deceleration of the machine 11 during the brake engagement at step 53. The actual deceleration may be determined based upon deceleration data received at the controller 21 from the IMU 37 and/or wheel speed sensor 35 during the brake engagement.

The predicted deceleration may be determined by the control system 20 based upon at least one operating condition of the brake system 18 measured during the brake engagement and a brake map stored on the memory 22 of the control system 20. The brake map may comprise a table, graph or the like storing data for enabling the calculation of the predicted deceleration based upon the at least one brake system operating condition. The brake map may be populated from test data obtained from operating the machine 11 or a similar machine 11 during testing at a predetermined (e.g. optimum or 100%) brake performance, such as when the brake system 18 is fully serviced with unworn components. The method 50 may comprise generating the brake map from test data at step 54. The test data may indicate the braking force (BF) associated with actual measured deceleration (AMD) of the machine 11, mass (M) of the machine 11, brake system operating condition (BSOC) and a constant (k) indicating the relationship between the brake system operating condition and the braking force:

$$BF = BSOC \times k = AMD \times M$$

The brake map may comprise a plurality of such values at a plurality of brake system operating conditions. The brake system operating condition may comprise the brake system pressure from at least one brake system pressure sensor 34 (which may be located in the brake system 18 at or close to the brake input 30 for detecting the application at the brake input 30 by the operator), the force applied to the brake pedal from the brake input sensor 33, the position of the brake pedal from the brake input sensor 33 (which may have a direct relationship with the brake system pressure) and/or the like. The brake map may provide values for a combination of different brake system operating conditions.

In order to determine the predicted deceleration, the method 50 may comprise retrieving the brake map from the memory 22 at step 55. The method 50 may comprise receiving, at the control system 20, data indicative of at least one brake system operating condition during the brake engagement at step 56 and the mass at step 57. The control system 20 may determine, based upon the brake map, the braking force corresponding to the measured brake system operating condition and mass at step 58. The control system 20 may determine, based upon the output from the inclination sensor 31 (which may be the IMU 37) and the wheel speed sensor 35, the inclination θ of the machine 11 at step 59. The control system 20 may determine, at step 60, the drag forces (DF) acting on the machine 11, such as aerodynamic drag and engine friction. The drag forces may be estimated from various operating parameters measured during the brake engagement such as the machine speed, engine rotating speed and power unit output torque. As a result, predicted deceleration may be determined at step 61 based upon the brake map, at least one brake system operating condition, mass, inclination θ and drag forces as (where g is gravitational force):

$$PD = (BF/M) - (g \times \sin \theta) - (DF/M)$$

In alternative embodiments, the predicted deceleration may not take into account the drag forces and/or inclination θ. Further alternatively, the predicted deceleration may instead be based upon a value provided by an operator via at least one input and/or based upon a minimum acceptable deceleration stored in the memory 22.

The control system 20 may determine the brake performance at step 62 and store the brake performance for the brake engagement as brake performance data on its memory 22 at step 63. The brake performance data may be communicated to the external computing system 26 via the network 27. If the brake performance falls below a minimum brake performance threshold an alert may be provided to the operator via the display 24, a light or the like at step 64. The control system 20 may repeat method 50 continuously by continuing to collect brake performance data for a plurality of brake engagements during the normal operation of the machine 11 and store them as brake performance data on the memory 22 for later retrieval, processing and/or display 24.

The control system 20 may determine a parasitic loss decelerating the machine 11 during the brake engagement. The parasitic loss may comprise an estimated rolling resistance and/or estimated windage losses. As a result, the control system 20 may account for additional forces acting in the deceleration of the machine 11 in addition to the brake system 18.

The control system 20 may also estimate the rolling resistance of the machine 11 during the brake engagement or just prior to the brake engagement and determine the brake performance based upon the estimated rolling resistance. The rolling resistance may comprise energy losses resulting from contact between the terrain 15 and the at least one wheel 14, such as due to deformation of the at least one wheel 14 and/or terrain 15.

The rolling resistance may be estimated based upon at least one operating condition of the machine 11 measured before the brake engagement and/or during the brake engagement. The rolling resistance may be calculated a plurality of times along a plurality of positions and/or continuously along a route of travel of the machine 11 and may be calculated using any suitable known method. The rolling resistance may be estimated based upon an estimated driving force $F_{drive}$ of the machine 11, inclination data from the inclination sensor 31 and/or from the IMU 37. The estimated driving force $F_{drive}$ may be an estimation or calculation of the force applied by the machine 11 where the at least one wheel 14 and/or track contacts the terrain 15 in-order-to move the machine 11. The estimated driving force $F_{drive}$ may be determined from lookup tables stored on the memory 22 based upon at least one operating condition. The estimated driving force $F_{drive}$ may be determined based upon an estimated driving torque or engine power driving the at least one wheel 14, which may be determined from the engine speed, transmission ratio, powertrain efficiency and the like, and the known radius of the at least one wheel 14.

An effective inclination $\theta_{eff}$ may be estimated based upon the estimated driving force $F_{drive}$ using:

$$F_{drive} = m \times g \times \sin \theta_{eff}$$

The effective inclination $\theta_{eff}$ may comprise the actual inclination $\theta_{act}$ of the machine 11 and an estimated rolling resistance inclination $\theta_{RR}$:

$$\theta_{eff} = \theta_{act} + \theta_{RR}$$

$\theta_{act}$ may be determined based upon the inclination data from the inclination sensor 31 and/or from the IMU 37 and the wheel speed sensor 35, and, as a result, the estimated rolling resistance inclination $\theta_{RR}$ determined. The estimated rolling resistance inclination $\theta_{RR}$ may therefore be used as an indication of the rolling resistance experienced by the machine 11.

Alternatively, the rolling resistance may be estimated from a map indicating the estimated rolling resistance of the terrain 15 across which the machine 11 travels. The map may be generated by estimating the rolling resistance as the machine 11 and other machines 11 travel over the terrain 15 prior to the brake engagement. The map may store the estimate of rolling resistance as estimated rolling resistance inclinations $\theta_{RR}$. The control system 20 may retrieve the map from its memory 22 and or via the network 27, locate the machine 11 on the map via the navigation system 32 and subsequently retrieve the corresponding rolling resistance.

The brake performance may be determined by incorporating the expected deceleration resulting from the estimated rolling resistance into the calculation of the brake performance at step 61. The estimated rolling resistance may be determined at step 70 and may be incorporated using the effective inclination $\theta_{\textit{eff}}$. The result is that the predicted deceleration may be determined as follows (optionally including the drag forces):

$$PD=(BF/M)-(g\times\sin\theta_{\textit{eff}})-(DF/M)$$

The brake performance may subsequently be calculated as disclosed above based upon this predicted deceleration incorporating the rolling resistance and an alert provided to an operator should the brake performance exceed a threshold value.

The control system 20 may also estimate the windage losses of the machine 11 during the brake engagement and determine the brake performance based upon the estimated windage losses. The windage losses may be in rotating components (e.g. shafts, gears, clutches) of the engine system 13 (in at least one of the powertrain 17, including axles, torque converter, transmission thereof or the power unit 16), brake system 18 or any other rotating components of the machine 11 in contact with oil. The oil may be brake cooling oil, gear lubricating oil, hydraulic oil and the like. The windage losses may comprise energy losses resulting from, for example, oil in the powertrain 17 thrown against the rotating components and/or wind generated within the powertrain 17 due to the rotation of such components. The viscosity of the oil, and therefore the temperature of the oil, may therefore affect the windage losses. In particular, during warmup of the engine system 13, the oil may increase in temperature such that the windage losses vary. Such variations may be amplified in heavier machines 11 with heavier weight oil around the rotating components. The control system 20 may account for such variations in windage losses in order to improve the accuracy of the brake performance assessment.

In particular, the control system 20 may store windage loss data on the memory 22 representing the power loss due to windage losses at a plurality of oil temperatures and a plurality of rotational speeds of the rotating components. The windage loss data may be collected by testing the rotating components at the plurality of oil temperatures and rotational speeds and determining the associated power loss.

The control system 20 may be configured to determine at least one oil temperature and at least one rotational speed of at least one rotating component during the brake engagement from at least one oil temperature sensor 39 and at least one engine system component speed sensor 40. Therefore, the control system 20 may at step 71 estimate the associated power loss based upon the at least one oil temperature, at least one rotational speed and the windage loss data. In particular, the control system 20 may estimate the power loss resulting from a plurality of rotating components by measuring each of their associated oil temperatures and rotational speeds. The resulting windage braking force (WBF) decelerating the machine 11 may be determined based upon the estimated power loss (PL), the wheel speed (WS) and the known wheel radius ($R_w$), which may be stored on the memory 22:

$$WBF=PL/(WS\times R_w)$$

The resulting deceleration (DW) due to windage losses may therefore be determined as:

$$DW=WBF/M=PL/(WS\times R_w\times M)$$

The result is that the predicted deceleration may be determined as follows at step 61 (optionally including the drag forces and the rolling resistance):

$$PD=(BF/M)-(g\times\sin\theta_{\textit{eff}})-(DF/M)-DW$$

The brake performance may subsequently be calculated as disclosed above based upon this predicted deceleration incorporating the windage losses and an alert provided to an operator should the brake performance exceed a threshold value.

The control system 20 may determine that windage loss in all or part of the powertrain 17 should not be taken into account in determining predicted deceleration when the windage loss in all or part of the powertrain 17 will not affect the deceleration. In particular, if the transmission is in neutral such that no power is transferred the control system 20 may only account for the windage loss between the decoupling point of the transmission (e.g. a clutch or torque converter) and the at least one wheel 14. Thus, if decoupling between components in the powertrain 17 is detected the control system 20 may at step 71 estimate the associated power loss based upon the at least one oil temperature, at least one rotational speed and the windage loss data only for the at least one component of the powertrain 17 between the decoupling and the at least one wheel 14. The rest of the method may be as discussed above. Whether a decoupling has occurred may be detected by at least one powertrain speed sensor and/or other sensor for determining whether components are coupled or decoupled in the powertrain 17.

The control system 20 may also determine brake performance accounting for brake engagements in which at least one rejection condition occurs. The at least one rejection condition may be a skid in which at least one wheel 14 locks or stops rotating whilst the machine 11 continues to move along the terrain 15.

Therefore, the method 50 may comprise at step 72 detecting that a skid has occurred during the brake engagement. Skidding may be detected using any suitable method or apparatus, such as a known anti-lock braking system (ABS). Skidding may be detected based upon the output from the IMU 37 indicating that the machine 11 is decelerating and the output from the at least one wheel speed sensor 35 indicating that the wheels are not rotating during the brake engagement.

The method 50 may comprise, at step 73, rejecting brake performance data associated with the brake engagement or preventing the generation or storing of brake performance data associated with the brake engagement. The control system 20 may not process or reject the relevant operating condition data of any one of steps 53, 55, 56, 57, 58, 59, 60, 61, 64, 70, 71 to generate brake performance data associated with the brake engagement. Alternatively, the control system may not perform the step 62 of calculating the brake performance or the step 63 of storing the brake performance on the memory 22. Hence brake performance data utilised for assessing the brake performance of the brake system 18 may not comprise brake performance data for a brake engagement in which a skid occurs.

Alternatively, the control system 20 may still determine a brake performance associated with the brake engagement via method 50 but will reject the brake performance. The control system 20 may store on the memory 22 brake performance data comprising a brake performance and a rejection marker associated with the brake performance if the brake performance relates to a brake engagement in which a skid occurs. The control system 20 may disregard the brake performance with an associated rejection marker during further analysis of brake performance data related to a plurality of brake engagements.

The at least one rejection condition may also be based upon the estimated rolling resistance and/or windage losses. In a similar manner to that discussed above, the control system 20 may determine at step 72 estimating the rolling resistance and/or windage losses. At step 73 the control system 20 may reject brake performance data associated with the brake engagement or prevent the generation or storing of brake performance data associated with the brake engagement if the rolling resistance exceeds a rolling resistance threshold value and/or if the windage losses exceed a windage loss threshold value. As a result, the brake performance can be assessed taking into account where the rolling resistance or windage losses may have resulted in unreliable brake performance data.

In embodiments of the present disclosure, wheel rotation sensors monitor the rotation of the wheels of the machine. When rotation of at least one wheel of the machine ceases during a braking event, e.g. while the machine is decelerating during the braking event, a signal is sent to the control system 20. When the control system 20 receives a signal that one of the machines wheels has locked/skid during the brake event, or when the at least one rejection condition is met, the control system 20 may invalidate the braking event and rejects all data associated with the braking event or prevents brake performance data associated with the braking event being generated.

The control system 20 may determine brake performance accounting for skids, rolling resistance and/or windage losses continuously during normal operating of the machine 11 and/or during the testing of the machine 11 to populate the brake map for calculating the braking force for use in the predicted deceleration calculations.

The control system 20 may also determine brake performance by processing the brake performance data indicating the brake performance over a plurality of brake engagements. The control system 20 may identify a brake performance event based upon a change of the brake performance between at least two brake engagements and a threshold value. If a brake performance event is identified the control system 20 may provide an alert to an operator.

Figure 4:
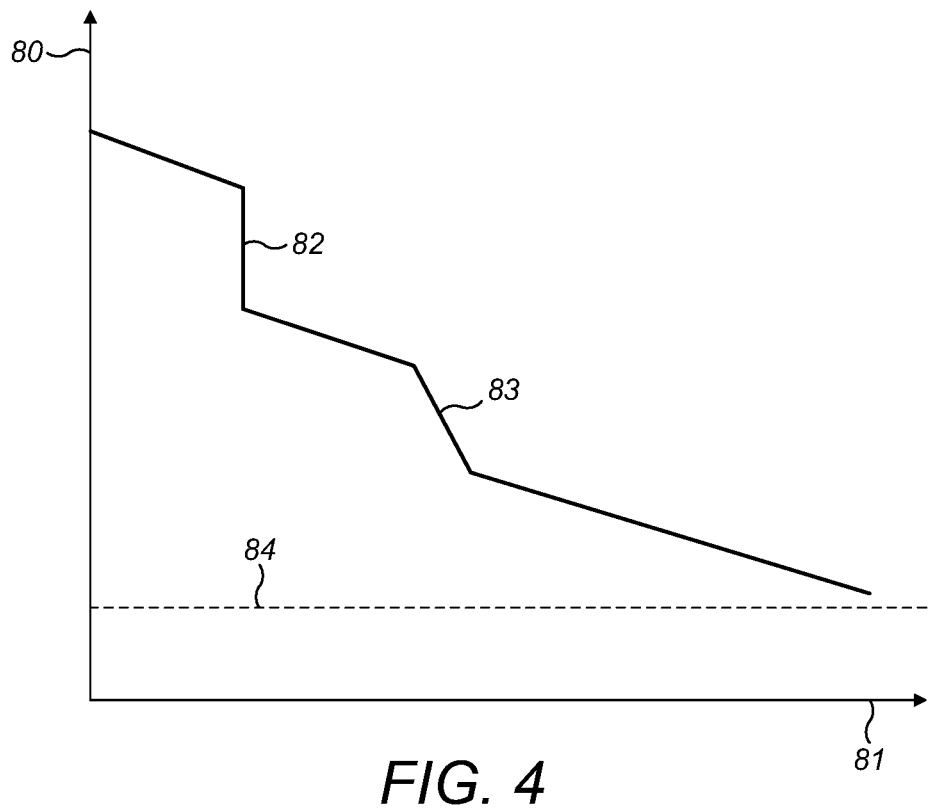
FIG. 4 is a graph illustrating brake performance against brake engagements over time.

As illustrated in FIG. 4, which is a graph of brake performance 80 against brake engagements over time 81, the control system 20 may identify a step brake performance event 82 based upon a step change in and/or a rate brake performance event 83 based upon a rate of change of the brake performance. The step and rate brake performance events 82, 83 may be identified when the brake performance are above the minimum brake performance threshold 84, below which an alert is provided to the operator.

Figure 5:
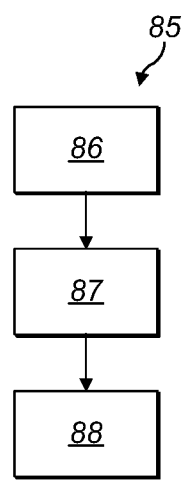
FIG. 5 is a flowchart of a further embodiment of a method according to the present disclosure.

The system 10 may perform the method 85 illustrated in FIG. 5. At step 86 the control system 20 may process the brake performance data stored on the memory 22. The control system 20 may comprise brake performance data related to at least 2, at least 5, at least 10, at least 100 or at least 1000 brake engagements. The brake performance data may be related to brake engagements during active testing in which the machine 11 is operated under known conditions (e.g. a proving grounds type test). Alternatively or additionally, the brake performance data may be related to brake engagements during normal operation of the machine 11 and may take into account the drag forces, rolling resistance and/or windage losses as disclosed above.

At step 87 the control system 20 may identify in the brake performance data at least one step and/or rate brake performance event(s) 82, 83. The step brake performance event 82 may be identified by the control system 20 based upon a step change in brake performance between at least two brake engagements and a magnitude of the step change exceeding a fixed step change threshold value. The rate brake performance event 83 may be identified by the control system 20 based upon a rate of change of the brake performance between at least two brake engagements exceeding a rate of change threshold value.

The fixed step change threshold value and/or fixed rate of change threshold value may be stored in the memory 22 and may be indicative of a step change magnitude or rate of change magnitude above which an issue with the brake system 18 may have occurred. The rate of change threshold value may comprise a fixed rate of change threshold value. The rate of change threshold value may be a past rate of change threshold value based upon rates of change of brake performance during brake engagements prior to the brake performance event. For example, the past rate of change threshold value may be an average rate of change of brake performance over a plurality of prior brake engagements, such as at least 10 prior brake engagements, at least 100 prior brake engagements and at least 1000 prior brake engagements.

At step 88 the control system 20 may, in response to detecting at least one brake performance event, provide an alert to the operator. The control system 20 may therefore identify an issue with the brake system 18 before the brake performance falls below the minimum brake performance threshold 84.

The control system 20 may further monitor the brake performance by determining the brake delay of the brake system 18. The brake delay may be the system 10 response between the operator instructing the machine 11 to engage the brake system 18 and the brake system 18 engaging to decelerate the machine 11.

Figure 6:
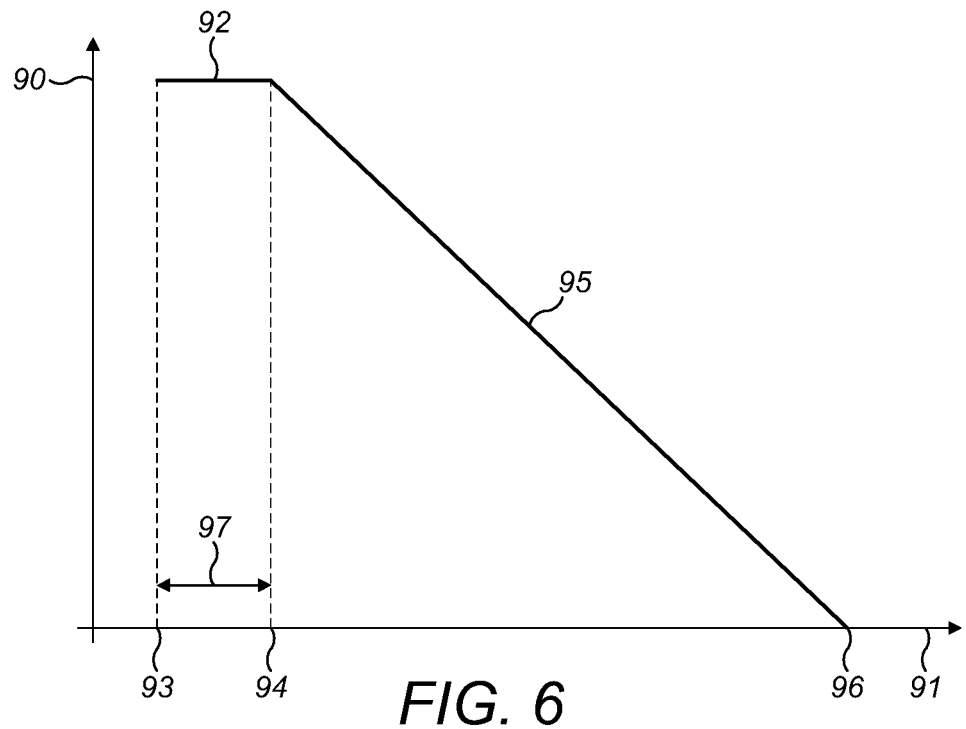
FIG. 6 is a graph illustrating a machine speed against a distance travelled during a brake engagement.

FIG. 6 illustrates a graph showing the machine speed 90 against distance 91 in which the machine speed 90 remains at a constant 92 between a first time instance 93 at which an input is provided by the operator to instruct the machine 11 and a second time instance 94 at which the brake system 18 engages. The machine 11 subsequently decelerates 95 to a halt at a third time instance 96. The brake delay may be the time period between the first and second time instances 93, 94 and the effect of the brake delay on brake performance may be the distance travelled 97 by the machine 11 during the brake delay. The control system 20 may determine the brake delay and may provide an alert when the brake delay is substantially impacting the brake performance, such as by the distance travelled exceeding a threshold distance and/or the brake delay exceeds a brake delay threshold value.

Figure 7:
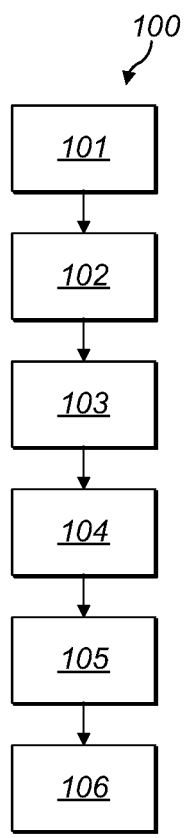
FIG. 7 is a flowchart of a further embodiment of a method according to the present disclosure.

The system 10 may therefore perform method 100 illustrated in FIG. 7. At step 101 control system 20 may detect an input via the brake input sensor 33 indicating that the operator is instructing the machine 11 to decelerate via the brake input 30. The input may be an actuation of a brake pedal and the input may be detected based upon an output from a brake pedal position sensor. At step 102 the control system 20 may operate the brake system 18, or the brake input 30 may operate the brake system 18 directly, to engage the brake system 18 in response to the input and thereby initiate a brake engagement. At step 103 the control system 20 may detect the engagement of the brake system 18 in response to the input. The engagement of the brake system 18 may be detected based upon an output from the at least one wheel speed sensor 35, such as by the output from the at least one wheel speed sensor 35 indicating that a reduction in a wheel speed has been initiated. The brake engagement may also be detected based upon the output from a brake system pressure sensor 34 located in the brake system 18 at or close to the at least one wheel 14, such as in fluid actuating a brake calliper or piston, for detecting the application by the brake system 18 to slow the at least one wheel 14.

At step 104 the control system 20 may calculate the brake delay as the time period between the detection of the input and the detection of the engagement (e.g. the start of the engagement) of the brake system 18. The brake delay may be detected based upon a clock within the controller 21. At step 105 the control system 20 may store the brake delay on the memory 22 as brake performance data, which may be in addition to brake performance data determined as disclosed above.

The control system 20 may, at step 106, operate the machine 11 based upon the brake delay. The control system 20 may provide an alert to the operator based upon the brake delay exceeding a brake delay threshold value indicative of an issue with the brake system 18 and/or control system 20. The control system 20 may also process the brake delay with the brake performance data associated with the brake engagement and identify a brake performance issue with the brake system 18 as being related to a component causing the brake delay. For example, if the brake performance falls below a threshold value, and the brake delay exceeds the brake delay threshold value, the control system 20 may determine that the brake performance issue with the brake system 18 relates to at least one component causing the brake delay.

In some aspects of the present disclosure, determining brake performance based upon a predicted deceleration may comprise rejecting generated brake performance data associated with a brake engagement or preventing the generation of brake performance data associated with the brake engagement.

In some aspect of the present disclosure, determining brake performance may occur during a plurality of brake engagements.

In some aspects of the present disclosure, rejecting generated brake performance data may comprise rejecting all brake performance data for a brake engagement in which a rejection condition occurs such that it is not processed for calculations relating to future or ongoing brake performance (i.e. it is excluded from the calculation of the brake performance over a plurality of brake engagements). Additionally, or alternatively, excluding brake performance data may comprise preventing generation of the brake performance data for that brake engagement In some aspects of the present disclosure, brake performance data may comprise a brake performance calculated using a predicted deceleration. In any embodiment, determining the brake performance may comprise detecting an actual deceleration of the machine during the brake engagement and determining the brake performance based upon the actual and predicted decelerations.

In some aspects of the present disclosure, the machine may be a vehicle configured to carry heavy loads, for example a material-carrying vehicle suitable for transporting mined or quarried material.

In some embodiments, monitoring performance of a machine's brake system may comprise a brake test step, wherein the machine is moved to a brake check location and a brake test is performed. The brake test may comprise at least one brake engagements carried out at the brake check location. The brake test step may comprise determining brake performance for the brake engagement or for a plurality of brake engagements performed at the brake check location. The brake performance during the one or more brake engagements may be compared to a known optimal brake performance at the brake test location. The optimal brake performance may be determined by testing, modelling and/or experimentation at similar locations.

Surface conditions of the surface over which the machine will travel during the brake test at the brake test location may be known. Surface conditions may comprise drag or friction properties of the surface, inclination of the surface etc. The surface conditions for the brake check location may be stored by or otherwise accessible to the control system. The surface at the brake test location may be configured to provide optimised conditions for braking.

The brake test step may comprise engaging the brakes while the machine is travelling at specified speed and/or using a specified braking force. The control system may be configured to carry out the brake test step automatically. The brake test step may be carried out according to a schedule, for example after a predetermined number of brake engagements or after a predetermined elapsed time since the previous test or maintenance event.

In some embodiments, the machine may comprise an automated vehicle/machine.

In some embodiments, the machine may be a first machine of a plurality of machines, and the method may further comprise the first machine sharing data relating to the parasitic loss at specified locations, for example a brake test location, with one or more other machines of the plurality of machines.

INDUSTRIAL APPLICATION

The method 50 may thus take rolling resistance and windage losses into account when determining the brake performance of the brake system 18. The brake performance data may therefore be a more accurate representation of the state of the brake system 18 and thereby lead to more accurate servicing and earlier identification of brake performance issues. The accuracy of brake performance data may be particularly improved if the machine 11 is an off-highway machine, which may encounter higher rolling resistances due to the variation in the type of terrain 15 (e.g. soil, sand etc) and higher windage losses due to the use of heavier oil.

The method 50 may thus take into account whether skidding occurred during the brake engagement, whether the rolling resistance exceeded a rolling resistance threshold and/or whether the windage losses exceeded a windage loss threshold value. Such events may result in the associated brake performance data being unreliable. The control system 20 may enable the assessment of brake performance without such unreliable data by rejecting it. The brake performance data for a plurality of brake engagements may thus be more reliable and, by excluding such unreliable data from test data, the brake map may be a more accurate basis for determining the predicted deceleration.

The method 85 of longer term trend analysis may enable the use of the brake performance data as a prognostic rather than only for determining maintenance intervals. In particular, brake performance issues may still occur when the brake performance are above the minimum brake performance threshold 84. The identification of brake performance events 82, 83 may provide, in addition to the minimum brake performance threshold 84, further means for identifying brake performance issues.

Excluding brake performance data for a brake engagement in which a rejection condition occurs from ongoing calculation of brake performance by rejecting or preventing generation of the brake performance data for that brake engagement may reduce processing requirements for ongoing brake performance calculations.

The method 100 of determining the brake delay may result in brake performance data that can be used to further analyse any reduction in brake performance. Therefore, the brake performance data can be used by the control system 20 and operator to identify the possible cause(s) of a reduction in brake performance.

The method of the present disclosure may comprise calculation of losses using measured inclination data (relating to inclination of the surface or the machine). This may be preferable to calculation of inclination data, as such calculations may be affected by other variables.

The method of the present disclosure may be of particular use in vehicles configured to transport large amounts of heavy material, for example vehicles for use in mining and quarrying. In such large vehicles, windage losses of the axles may be large and may be heavily dependent on oil temperatures. This may be in contrast to smaller vehicles, such as cars, which have smaller axles and losses are less dependent on oil temperatures.

The invention claimed is:

1. A method of monitoring brake performance of a brake system of a machine, the method comprising:
    detecting a brake engagement for decelerating the machine;
    determining a parasitic loss decelerating the machine during the brake engagement;
    determining a predicted deceleration of the machine during the brake engagement based upon the parasitic loss; and
    determining brake performance based upon the predicted deceleration,
    wherein the parasitic loss comprises an estimated windage loss in the machine, and the estimated windage is determined from an oil temperature of oil lubricating a rotating component of an engine system or a powertrain of the machine.

2. The method as claimed in claim 1 wherein:
    the parasitic loss comprises an estimated rolling resistance of the machine or the estimated windage loss in the machine during the brake engagement; and
    the estimated rolling resistance is determined from an estimated driving force of the machine and inclination data.

3. The method as claimed in claim 2, wherein the rolling resistance is determined from an inclination of the machine as measured by an inclination sensor.

4. The method as claimed in claim 1, wherein the powertrain comprises an axle.

5. The method as claimed in claim 1, wherein the parasitic loss is estimated based upon at least one operating condition of the machine measured before the brake engagement or during the brake engagement.

6. The method as claimed in claim 5, wherein the parasitic loss comprises an estimated rolling resistance of the machine.

7. The method as claimed in claim 6, wherein the at least one operating condition of the machine comprises a location of the machine and the parasitic loss is estimated based upon the location of the machine and optionally a map indicating the estimated parasitic loss due to rolling resistance at the location of the machine.

8. The method as claimed in claim 7, wherein the rolling resistance is estimated based upon an estimated driving force of the machine and an actual acceleration of the machine.

9. The method as claimed in claim 8, wherein the estimated driving force is determined based upon lookup tables and at least one operating condition or based upon an estimated driving torque driving at least one wheel of the machine and a known radius of the at least one wheel.

10. The method as claimed in claim 6, wherein the at least one operating condition of the machine comprises a location of the machine and the rolling resistance is estimated based upon the location of the machine and a map indicating the estimated rolling resistance of a terrain across which the machine is travelling.

11. The method as claimed in claim 10, wherein the estimated rolling resistance is determined from an inclination of the terrain.

12. The method as claimed in claim 1 comprising:
    determining whether at least one rejection condition occurs during the brake engagement; and
    in response to the detection of at least one rejection condition, rejecting generated brake performance data associated with the brake engagement or preventing the generation of brake performance data associated with the brake engagement.

13. The method as claimed in claim 12, further comprising determining whether the parasitic loss exceeds a threshold value; and
    wherein determining whether the parasitic loss exceeds a threshold value comprises:
    estimating a rolling resistance of the machine and determining that the estimated rolling resistance exceeds a rolling resistance threshold value; or
    estimating windage losses in the machine during the brake engagement and determining that the windage losses exceed a windage loss threshold value.

14. The method as claimed in claim 12, wherein rejecting generated brake performance data comprises:
    preventing the storing of the generated brake performance data on a memory; or
    storing on the memory generated brake performance data comprising the brake performance and a rejection marker associated with the brake performance.

15. The method as claimed in claim 12, wherein rejecting generated brake performance data comprises disregarding the generated brake performance during further analysis of brake performance related to a plurality of brake engagements.

16. The method as claimed in claim 1, further comprising:
    detecting an actual deceleration of the machine during the brake engagement and determining the brake performance based upon the actual and predicted decelerations.

17. The method as claimed in claim 1, wherein the predicted deceleration is further determined based upon at least one operating condition of the brake system measured during the brake engagement and a brake map.

18. The method as claimed in claim 17, wherein the at least one operating condition of the brake system comprises at least one of a brake system pressure, an inclination of the machine, a mass of the machine and a drag force of the machine.

19. The method as claimed in claim 17, wherein the brake map comprises a plurality of values of braking force for at least one operating condition of the brake system at a predetermined brake performance, preferably at optimum brake performance.

20. The method as claimed in claim 1, wherein estimating the windage loss comprises:
determining at least one oil temperature of oil in contact with the at least one rotating component;
determining at least one rotational speed of the at least one rotating component;
retrieving windage loss data; and
determining the windage loss based upon the at least one oil temperature, at least one rotational speed and windage loss data.

21. The method as claimed in claim 1, wherein the predicted deceleration is determined based upon an estimation of the deceleration resulting from the estimated windage loss or estimated rolling resistance.

22. The method as claimed in claim 1, further comprising: generating an alert based upon the determined brake performance.

23. The method as claimed in claim 22 comprising determining that the brake performance has reached a minimum brake performance threshold and, in response, generating the alert.

24. The method as claimed in claim 1, wherein the machine comprises an automated vehicle.

25. The method as claimed in claim 1, wherein the method further comprises moving the machine to a brake test location and carrying out a brake test, the brake test comprising one or more brake engagements, wherein a brake performance of the brake system is determined over the duration of the brake test.

26. The method as claimed in claim 24, wherein a rolling resistance of the terrain at the brake test location is known.

27. The method as claimed in claim 1, wherein the machine is a first machine of a plurality of machines, wherein the method further comprises the first machine sharing data relating to the parasitic loss at specified locations with one or more other machines of the plurality of machines.

28. A system comprising:
a machine comprising a brake system; and
a control system for monitoring the brake performance of the brake system and configured to:
detect a brake engagement for decelerating the machine;
determine a parasitic loss decelerating the machine during the brake engagement;
determine a predicted deceleration of the machine during the brake engagement based upon the parasitic loss; and
determine brake performance based upon the predicted deceleration,
wherein the parasitic loss comprises an estimated windage loss in the machine, and the estimated windage is determined from an oil temperature of oil lubricating a rotating component of an engine system or a powertrain of the machine.

29. The system as claimed in claim 28, wherein the control system is configured to carry out a method, the method comprising:
detecting the brake engagement;
determining the parasitic loss;
determining the predicted deceleration; and
determining the brake performance of the machine.

* * * * *